United States Patent
Giroire et al.

[19]

[11] Patent Number: 5,855,267

[45] Date of Patent: Jan. 5, 1999

[54] CLUTCH MODULE HAVING IMPROVED MEANS FOR FASTENING ITS COVER PLATE ON THE REACTION PLATE

[75] Inventors: Jean-Pierre Giroire, St. Germain-En-Laye; Paolo Viola; Michel Graton, both of Paris; Alain Lemaire, Amiens, all of France

[73] Assignee: VALEO, Paris, France

[21] Appl. No.: 740,120

[22] Filed: Oct. 24, 1996

[30] Foreign Application Priority Data

Oct. 24, 1995 [FR] France .................................... 95 12523
Dec. 20, 1995 [FR] France .................................... 95 15138

[51] Int. Cl.⁶ ........................................................ F16D 13/58
[52] U.S. Cl. ........................................ 192/70.27; 192/89.23
[58] Field of Search ........................... 192/89.23, 89.24, 192/89.22, 70.27, 112

[56] References Cited

U.S. PATENT DOCUMENTS

| | | | |
|---|---|---|---|
| 3,317,013 | 5/1967 | Smirl | 192/112 X |
| 4,593,803 | 6/1986 | Valier | 192/70.18 X |
| 4,650,050 | 3/1987 | Alas et al. | 192/89.24 X |
| 4,655,333 | 4/1987 | Martinez-Corral | 192/89.24 X |
| 4,655,334 | 4/1987 | Valier | 192/89.24 |
| 4,811,826 | 3/1989 | Kittel et al. | 192/89.23 X |
| 5,321,878 | 6/1994 | Schierling et al. | 192/70.27 X |
| 5,392,888 | 2/1995 | Kajitani et al. | 192/89.22 X |
| 5,593,014 | 1/1997 | Viola et al. | 192/89.23 X |
| 5,634,542 | 6/1997 | Grosse-Erdmann et al. | 192/70.27 |

FOREIGN PATENT DOCUMENTS

| | | |
|---|---|---|
| 2546594 | 11/1984 | France . |
| 2710377 | 3/1995 | France . |
| 2723996 | 3/1996 | France . |

*Primary Examiner*—Rodney H. Bonck
*Attorney, Agent, or Firm*—Longacre & White

[57] ABSTRACT

A clutch module (100) includes a cover plate (12), a diaphragm (14), a pressure plate (16), a friction disc (18) and a reaction plate (20) mounted on a support plate (22) and fixed to the cover plate (12), the cover plate (12) includes a set of fastening lugs (66) which extend axially from a peripheral edge (58) of the cover plate (12, 56), and each of which passes axially through a corresponding axially orientated passage (68, 168) formed at the periphery (70) of one of the support plate (22) and the reaction plate (20), so as to extend axially beyond (90) the radial face (72, 172) of the element and so as to be retained axially with respect to the reaction plate (20) or support plate (22).

17 Claims, 5 Drawing Sheets

CLUTCH MODULE HAVING IMPROVED MEANS FOR FASTENING ITS COVER PLATE ON THE REACTION PLATE

BACKGROUND OF THE INVENTION

1. Field of the Invention

The present invention relates to a clutch module, especially for a motor vehicle.

More particularly, the invention relates to a clutch module of the type comprising an assembly of adjacent components of generally annular form coaxial with each other, among which are arranged, in succession, a cover plate, a diaphragm, a pressure plate coupled in rotation to the cover plate by fastening means for enabling the pressure plate to be displaced axially with respect to the cover plate, a friction disc for coupling the clutch module in rotation to a driven shaft, and a reaction plate fixed to the cover plate by fastening means arranged at the outer periphery of the module, of the type in which the friction disc includes at least one peripheral annular friction liner, which is interposed between radial friction surfaces, in facing relationship with each other of the pressure plate and reaction plate, wherein the diaphragm bears against the cover plate and the pressure plate in order to bias the latter axially in the direction corresponding to gripping of the friction liner, and of the type in which the reaction plate is mounted on a support plate which is fixed in rotation to a driving shaft, such as the crankshaft of an internal combustion engine, by means of a set of fastening members which are disposed radially inwardly with respect to the means fastening the reaction plate to the cover plate.

2. Description of the Prior Art

One example of such a clutch module is described and shown in FIG. 6 of the document FR-A-2 546 594. In that document, the means fastening the cover plate on the reaction plate, in order to form a unitary assembly in the form of a clutch module, consist of the axially orientated annular skirt, or lateral wall, which is at the outer periphery of the cover plate, and the free end of which is seamed radially inwardly around an external peripheral rib or bead of the pressure plate.

That arrangement does give satisfaction, but, for a given radial size, the friction disc is unable to be of a maximum size, because the reaction plate is a mirror image of the pressure plate and includes lugs at its outer periphery for coupling it in rotation to the pressure plate through resilient tongues, each of which is fixed at one of its ends to the lug of the reaction plate, and at its other end to the lug of the pressure plate. The presence of the tongues thus prevents the size of the friction disc from being increased in the radial direction.

In addition, rotation of the cover plate cannot be prevented in any positive way, such as with the aid of fastening screws.

Other, more complex, fastening means are proposed in the said document, for example in FIG. 2, in which it is proposed to make use of fastening screws in order simultaneously to fasten the cover plate on the reaction plate and to fasten the latter on the support plate. In that case, it is the presence of the heads of the screws that prevents the size of the friction disc from being increased radially.

SUMMARY OF THE INVENTION

An object of the present invention is to propose a clutch module of the type mentioned above which includes means for fastening the cover plate on to the assembly that consists of the support plate and the reaction plate, and which supplies a remedy for the drawbacks just mentioned.

With this in view, the invention proposes a clutch module which includes at its outer periphery a starter crown carried by one of the elements consisting of the support plate and the reaction plate, characterised in that the pressure plate is coupled directly in rotation to the cover plate by the said attachment means, in that the cover plate includes at its outer periphery a set of fastening lugs which extend axially from a peripheral edge of the cover plate, and each of which extends axially through an axially orientated passage formed at the outer periphery of one of the elements consisting of the support plate and the reaction plate, so as to extend axially beyond the axial end face of the said element that lies furthest away from the friction disc, and in that the projecting free end portion of the fastening lug is retained axially with respect to one of the said elements consisting of the support plate and the reaction plate.

The reaction plate is simplified thanks to the invention, because, by comparison with the arrangements described in the document FR-A-2 546 594, it does not have any fastening lugs, since the attachment means act in the present invention directly between the cover plate and the pressure plate.

For a given radial size, this then enables the size of the friction liner or liners of the friction disc, and/or the size of the damper which is usually incorporated in the said disc in its central part, to be increased. In addition, the cover plate is positively prevented from rotating with respect to the support plate or the reaction plate carried on its support plate.

In general terms, the fastening means are of reduced radial size. They are offset axially with respect to the friction disc, which thus enables them to be located very close to the outer periphery of the cover plate which includes the fastening lugs.

In one embodiment, each of the fastening lugs extends axially through an axially orientated passage formed at the outer periphery of the reaction plate, with the free end portion of the fastening lug being retained axially with respect to the reaction plate.

In this case, the axial end face in accordance with the invention consists of the radial face of the reaction plate which is opposed to the radial friction surface of the same plate.

Thus, in accordance with the invention, it is possible to fix the reaction plate on to its support plate with the aid of screws which are accommodated within the reaction plate, with holes being formed in axial coincidence in the cover plate, the diaphragm, the pressure plate and the friction disc, in order to give access to the heads of the screws.

In another version, it is possible to form the passages in the support plate, with the free end portion of the fastening lug being retained axially with respect to the support plate.

In all cases, it is possible to adjust the load exerted by the diaphragm, and/or its angle of inclination or its position, by causing the lugs to penetrate into their associated passages to a greater or lesser extent. In this way, easy telescopic fitting of the cover plate is obtained.

In addition, the form of the cover plate is simple because it does not have any radial fastening flange as in FIG. 2 of the document FR-A-2 546 594.

Preferably, the fastening lugs project from an axially orientated annular cylindrical skirt formed on the cover plate at its outer periphery. This skirt thus has the form of a circumferential comb, with the lugs constituting the free end portion of the skirt.

By virtue of the passages and lugs, it is possible to index the cover plate. In order to constitute a locating element, for example, at least one lug and one passage can be of a different size. In another version, this lug and this passage are not spaced apart in a regular way.

In accordance with further features of the invention, in a first embodiment:

the free end portion is welded to the reaction plate, which enables the lugs to be telescopically fitted into the passages, and also enables the free end portion to be welded in position after the position of the diaphragm has been adjusted;

the free end portion is upset radially, for example inwardly;

each passage is an annular groove formed in the outer peripheral surface of the reaction plate, and is open radially outwardly;

the reaction plate carries a starter crown at its outer periphery, and each passage is located radially inwardly with respect to the starter crown;

the starter crown is fitted on a surface which is machined in the outer peripheral surface of the reaction plate, and the radial depth of which is smaller than that of the axial groove;

the free end portion is welded to the starter crown;

the free end portion is bent back radially outwardly in line with a portion of the starter crown in facing relationship with it.

In another embodiment in accordance with the invention, the projecting free end portion of the fastening lug is retained axially with respect to the support plate and to the reaction plate, the starter crown being secured by welding to the support plate, being fitted on the outer peripheral surface of the said support plate.

Thanks to this arrangement, the starter crown is fastened in position in a simple and inexpensive way without having to be shrink-fitted on to the reaction plate, which is a tiresome operation involving the application of heat.

In accordance with further features of this embodiment, the free end portion is welded to the starter crown, which enables the lugs to be fitted telescopically into the passages and enables the free end portion, which in a modified version may be bent back radially inwardly or radially outwardly in line with a portion of the starter crown in facing relationship with it, to be welded after the position of the diaphragm has been adjusted.

In a modified version, the free end portion of the lugs is seamed, or preferably welded, to the starter crown. Each passage is an axial groove formed in the outer peripheral surface of the support plate, and is open radially outwardly.

The lugs can of course extend through aligned passages formed in the reaction plate and the support plate. These lugs may be positively coupled in rotation to the reaction plate via the passages in the latter, and may extend with a circumferential clearance through the passages in the support plate, being retained axially by the said support plate that includes the starter crown.

In this embodiment, the passages are easy to form in the support plate, and the reaction plate is of simple form.

In all cases good ventilation of the clutch is obtained.

Further features and advantages of the invention will appear on a reading of the following detailed description, for an understanding of which reference is made to the attached drawings, in which:

DETAILED DESCRIPTION OF THE PREFERRED EMBODIMENT

Figure 1:
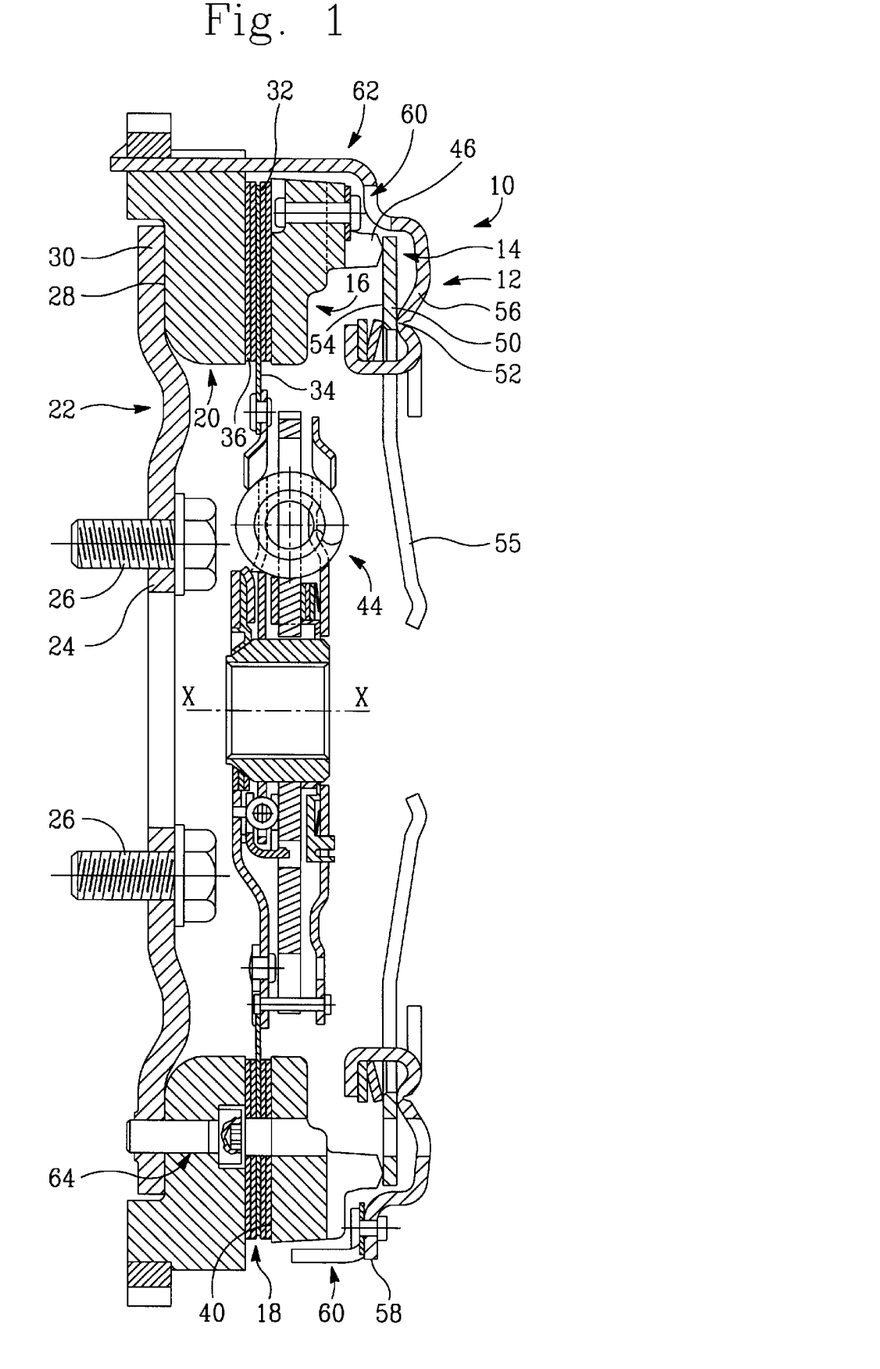
FIG. 1 is a view in axial cross section of a clutch module made in accordance with the provisions of the present invention.
Figure 4:
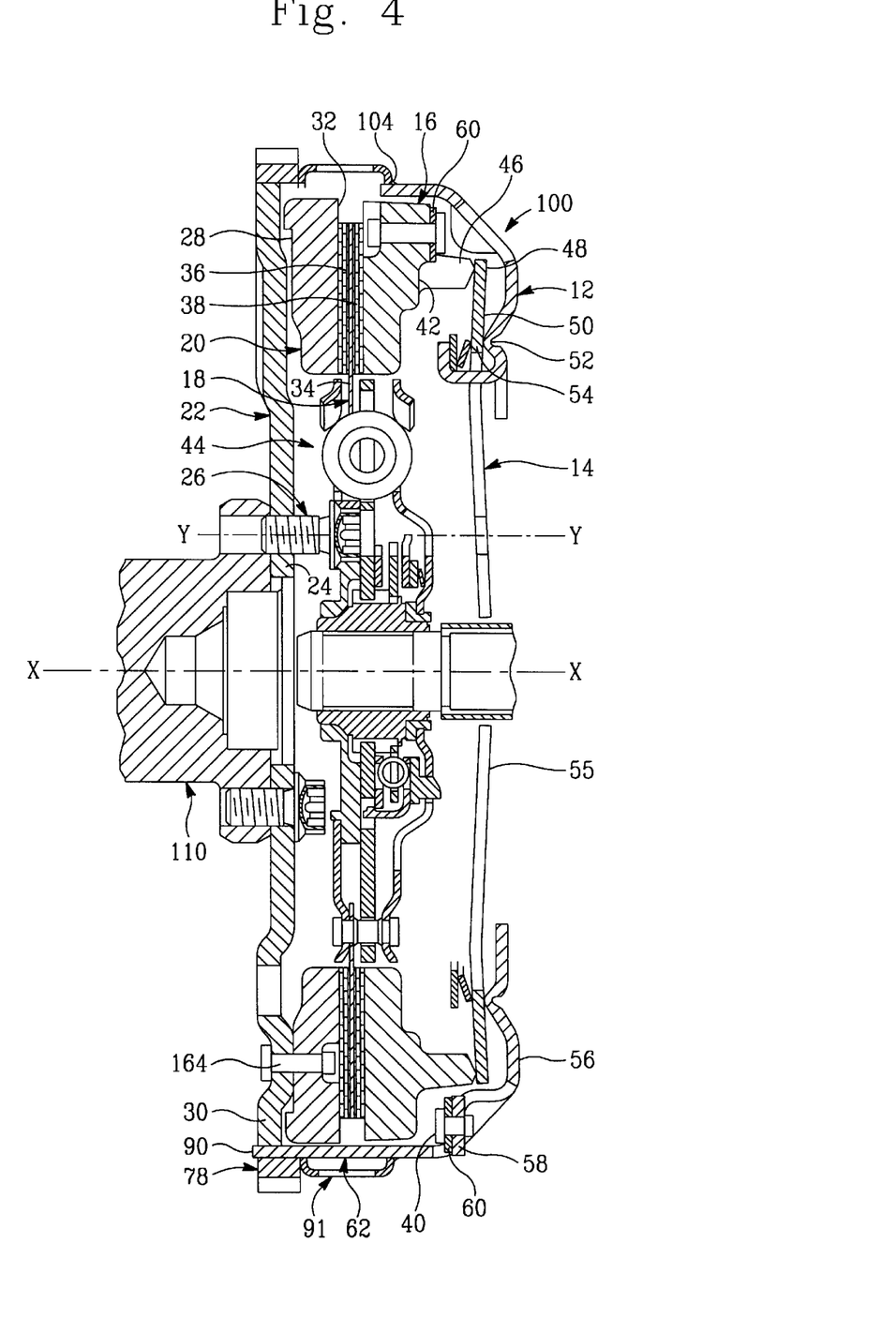
FIG. 4 is a view in axial cross section of a clutch module in accordance with the invention in a second embodiment.

FIGS. 1 and 4 show a clutch module for a motor vehicle.

The module 100 comprises a unitary assembly consisting of adjacent components of generally annular form, which are coaxial on the axis X—X of the clutch module. Among these annular components are, in axial succession, a cover plate 12, a diaphragm 14, a pressure plate 16, a friction disc 18 and a reaction plate 20.

The reaction plate 20 is arranged to be carried in rotation on the crankshaft (shown at 110 in FIG. 4) of an internal combustion engine for a motor vehicle, being fixed to the latter by means of an interposed support plate 22 in the form of an annular disc, the central portion 24 of which is fixed to the crankshaft by means of studs 26.

The reaction plate 20 is a cast component of annular form, which is bounded axially by a first radial surface 28, orientated generally transversely, against which there bears the peripheral annular crown portion 30 of the support plate 22, which in this example is of metal, and by an opposite radial surface 32, which is a machined surface that serves as one of the friction surfaces for the friction disc 18.

As in a known version, the friction disc consists here essentially of a generally annular support disc 34 which carries a continuous annular friction liner on each of its opposed faces.

A first liner 36 is arranged to cooperate with the radial friction surface 32 of the reaction plate 20, while the opposite friction liner 38 is arranged to cooperate with a radial friction surface 40 which constitutes one of the two transverse surfaces bounding the pressure plate 16, the latter being a generally annular cast component which is bounded axially, opposite to the friction surface 40, by a generally transversely orientated face 42.

In accordance with a known design, the support disc 34 which supports the friction liners 36 and 38 is arranged to be coupled, through an internally splined central hub (not identified by a reference numeral), to a driven shaft (shown in FIG. 4), such as for example the input shaft of the gearbox of the motor vehicle, with a damper 44, which will not be described in any further detail here, being interposed.

The transverse face 42 of the pressure plate 16 includes a set of bosses 46 which are spaced apart circumferentially at regular intervals, and each of which projects axially towards the cover plate 12, so that they constitute abutments for the external peripheral zone 48 of the resilient annular ring 50, which constitutes the outer peripheral portion of the diaphragm 14.

In this connection, in accordance with a known design, the diaphragm 14 includes an annular outer peripheral portion 50 in the form of a Belleville ring, which is interposed elastically between the bosses 46 of the pressure plate 16 and an annular abutment rib 52, which extends in relief towards the interior of the cover plate 12, and on which the inner peripheral zone 54 of the Belleville ring bears, the latter being extended radially inwardly by a central portion divided into radial fingers 55 by slots which separate each of the said fingers from the next.

The function of the Belleville ring 50 is to bias the pressure plate axially in the direction corresponding to axial gripping of the friction disc 18 between the friction surfaces 32 and 40.

The cover plate 12 is of hollow form, and consists essentially of an annular web 56, orientated generally transversely, which includes, in the vicinity of its outer peripheral edge 58, means 60 for its attachment to the pressure plate 16, these attachment means 60 being such as to permit, in accordance with a known design, a relative axial displacement of the pressure plate 16 with respect to the cover plate 12. They act directly between the pressure plate 16 and the cover plate 12.

The attachment means 60 consist in this example, in a known manner, of tangentially orientated resilient tongues, one end of which is secured by riveting to the outer peripheral edge 58 of the web 56 that constitutes the base portion of the cover plate 12, the other ends of the tongues being fixed to the pressure plate 16.

In this example, this fastening is obtained with the use of rivets, though in another version it may be obtained with the use of screws, bolts, or any other fastening members. The edge 58 is orientated generally transversely. This edge is pierced, in order to give access to the heads of the rivets whereby the tongues 60 are fastened to the pressure plate 16. The friction surface 40 of the plate 16 has local recesses for giving access to the said rivets.

Thus, the tongues 60 are first fixed to the flange 58, the diaphragm 14 having been already fitted on to the cover plate 12, and the other end of the tongues is then secured. In this way, a first unitary subassembly is obtained, which consists of the pressure plate 16, the diaphragm 14 and the cover plate 12.

It will be noted that in the present case, the clutch is of the push-to-release type, the diaphragm 14 being mounted for tilting deflection on the cover plate 12. Normally, the diaphragm 14 bears on the rib 52 carried by the web (or base portion) 56, which has a central hole, of the cover plate 12, this rib constituting a primary abutment for the diaphragm 14, and, by virtue of the bosses 46, the diaphragm biases the pressure plate 16 towards the reaction plate 20 for the purpose of gripping the friction liners 36, 38 between the plates 16, 20.

Thus the torque is transmitted from the crankshaft to the input shaft of the gearbox by means of the friction disc 18.

The clutch is thus engaged.

In order to disengage the clutch, a thrust is exerted by a clutch release bearing, not shown, on the inner ends of the fingers 55 of the diaphragm 14. The latter is deflected in a tilting mode, so as to bear on its secondary abutment to be described later herein. The tongues then displace the pressure plate 16 towards the base portion 56 of the cover plate, so that the friction liners 36, 38 are released. The clutch is now disengaged.

In this example, the diaphragm 14 is mounted for tilting deflection on the cover plate 12 in a known manner, with the aid of assembly lugs which project integrally from the base portion 56 of the latter, being formed by stamping out and bending, the cover plate being made of press-formed sheet metal. The lugs are orientated axially, and extend through the diaphragm via apertures which are formed in the latter in the region of the root of its fingers 55, that is to say at the inner periphery 54 of its Belleville ring 50. These apertures constitute the widened blind ends of the slots that separate the fingers 55 from each other. Beyond the diaphragm, the lugs, at their free end, are bent back radially away from the axis X—X of the assembly, so as to form a locating bend for a support ring for a crown ring which bears on the other face of the diaphragm 14. This crown ring, which is interposed between the diaphragm 14 and the support ring, is of frusto-conical form, and has at its outer periphery a rounded form which makes contact with the diaphragm 14, and which defines a secondary abutment lying in facing relationship with the primary abutment 52.

It is of course not obligatory to provide the support ring. In another version, the assembly lugs may be replaced by spacer bars, the heads of which are profiled so as to define a secondary abutment, with the said spacer bars carrying a ring which is interposed between the base portion of the cover plate and the diaphragm so as to define the primary abutment.

The clutch may of course be of the pull-to-release type, with the Belleville ring 50 then bearing at its outer periphery on an annular rib of the cover plate 12, and at its inner periphery on a boss of the pressure plate 16. In that case, the clutch release bearing exerts a pulling force on the inner ends of the fingers 55 of the diaphragm in order to disengage the clutch.

Similarly, the friction disc may have only one single friction liner, within which the disc 34 is embedded. This liner has two faces for cooperation with the friction surfaces 32 and 40.

The cover plate 12 also includes fastening means 62 which extend axially from its outer peripheral edge 58 towards the reaction plate 20, and which enable the cover plate 12 to be fastened on the plate 20 in such a way as to form a clutch module which constitutes a subassembly that is able to be fitted and secured on the support plate 22 by means of a set of fastening members, i.e. fastening screws 64 (FIG. 1) or fastening rivets 164 (FIG. 4).

The screws 64 or the rivets 164 are fitted radially inwardly of the fastening means 62. In FIG. 1, the screws are carried by the reaction plate 20, their heads being mounted in a housing in the form of a bore which is formed in the friction surface 32 of the reaction plate 20. The threaded shanks of the screws 64 extend through the plate 20 so as to be screwed into a threaded hole formed in the crown portion 30 of the plate 22. It will be noted that the plate 22 has local portions of increased thickness in which the above mentioned threaded holes are formed. In another version, the screws 64 extend through the crown portion 30 so as to be screwed into a nut, which is preferably fixed to the crown portion 30, for example by welding.

The cover plate 12, the Belleville ring 50 of the diaphragm 14, the pressure plate 16, the friction liners 36, 38 and the support disc 34 are formed with holes, which are aligned axially with each other so as to constitute passages for giving access to the screw heads, for example with a screwdriving machine for tightening the screws 64 all together, so securing the module 100 on to the plate 22 in an automated operation. The heads of the screws are of course formed with profiles, and they are for example formed with hexagonal recesses, or are of polygonal form for cooperation with the screwdriving machine.

Figure 11:
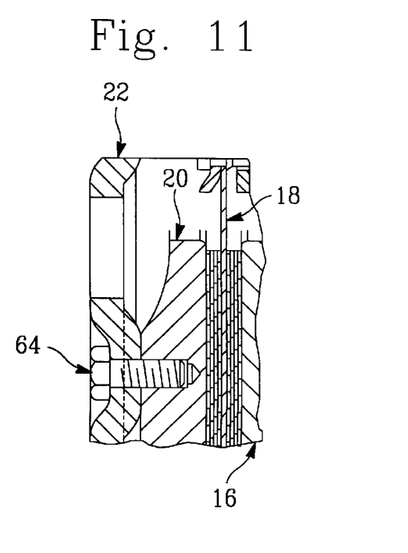
FIG. 11 is a partial view of FIGS. 5 and 8, showing another way of securing together the reaction plate and the support plate.

It is of course possible to reverse the structures in a manner similar to FIG. 11, with the threaded portions of the screws 64 being screwed into the reaction plate 20, and with the heads of the screws bearing against the front face of the plate 22. However, this is a less favourable arrangement because the screws 64 run the risk of becoming loose, the reaction plate 20 being hotter than the plate 22. In addition, this arrangement is less easy to carry out using automated assembly.

In all cases, in FIG. 1 as in FIG. 4, the friction liners 36, 38 have a substantial depth, and are able to come as close as possible to the fastening means 62.

For a given radial size of the module 100, the fastening means 62 enable the friction liners 36, 38 to be given a substantial depth, which enables the above mentioned holes, for access to the heads of the screws in the manner already explained, to be formed in FIG. 1, the diameter of the heads of the screws being smaller than at least that of the holes formed in the liners 36, 38 and the disc 34, so as to prevent the screws 64 from escaping.

In addition, the damper 44 of FIG. 1 is intact in all cases, and can be of the standard type, while the cover plate is simplified.

In all of the Figures, the fastening means 62 consist of a series of fastening lugs 66 orientated generally axially, which extend axially towards the reaction plate 20 from the peripheral edge 58 of the portion 56, in the form of an annular disc, of the cover plate 12.

The lugs 66, which constitute tenons, are for example spaced apart circumferentially in a uniform manner at the periphery of the cover plate 12.

The means fastening the cover plate 12 on the reaction plate will now be described in greater detail with reference to FIGS. 2 and 3.

Each fastening lug 66 is received, in this example with a fitting clearance, in an axially orientated passage 68 which is formed in the vicinity of the outer peripheral surface 70, the form of which is generally that of an annular cylinder, of the reaction plate 20. The lugs 66 are retained axially with respect to the reaction plate 20, being secured on the latter or on the starter crown 78 which is part of the same plate.

Figure 2:
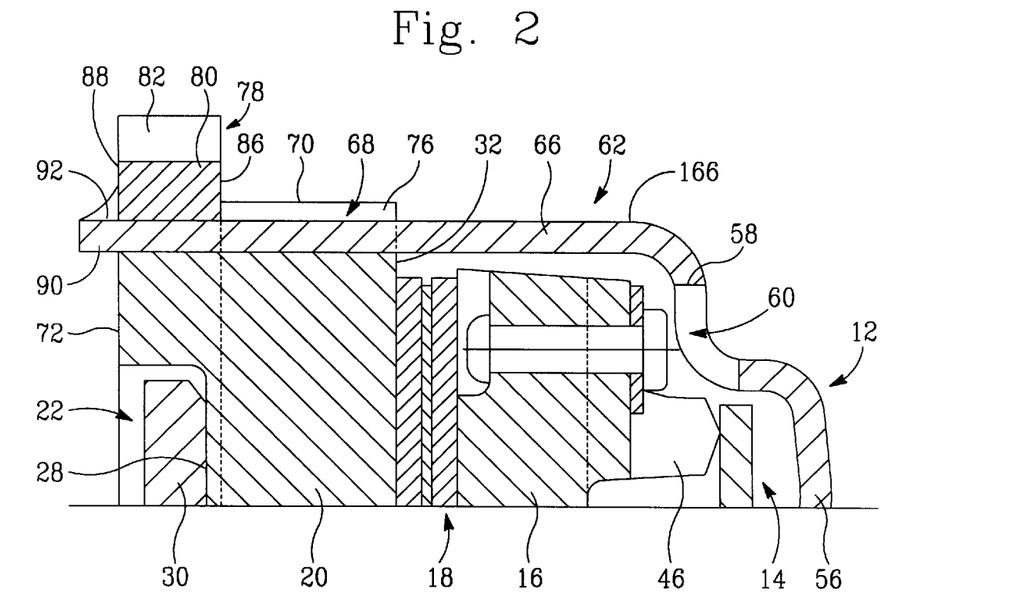
FIG. 2 is a view on an enlarged scale of the upper part of FIG. 1.
Figure 3:
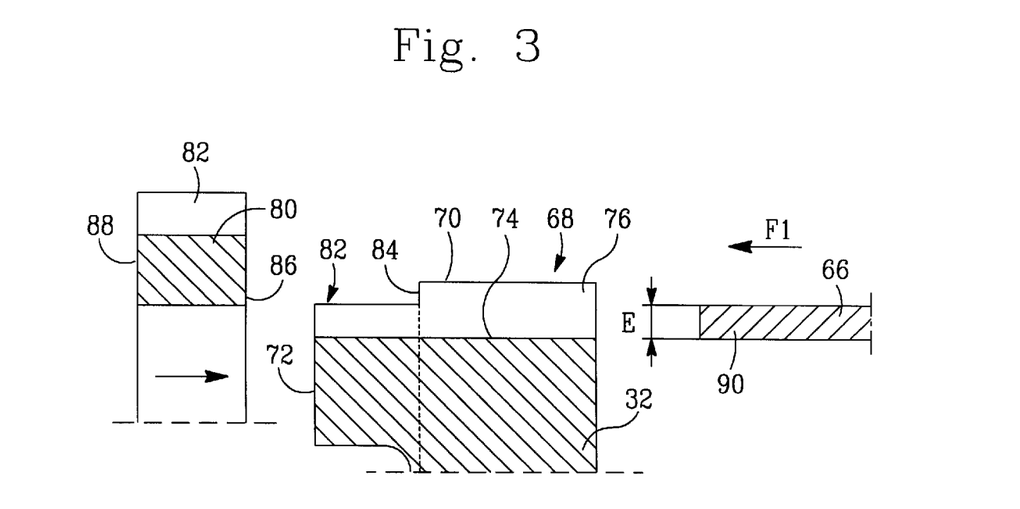
FIG. 3 is a view similar to that in FIG. 2, which shows some of these components in an unassembled position.

In the embodiment shown in FIGS. 1 to 3, each passage 68, constituting a mortice, is made in the form of an axial groove which is open at both ends, firstly in the friction surface 32 and secondly in the annular transverse end face 72 of the reaction plate 20 furthest away from the friction disc 18.

Each groove 68 is bounded on the radially inward side by a base 74, and is open radially on the outside in the outer peripheral surface 70.

The width of each groove, defined between its two parallel flanks 76, is slightly greater than the circumferential width of the fastening lug 66, so that the latter is able to be easily introduced, with a fitting clearance, axially into the groove 68 from right to left in the direction of the arrow F1 in FIG. 3. An assembly of the tenon and mortice type is thus formed.

In the embodiment shown in FIGS. 1 to 3, the reaction plate 20 carries at its periphery a starter crown 78, which is of generally annular form and comprises an annular cylindrical body with teeth 82.

In accordance with a known design, the crown 78 is shrunk on to a cylindrical surface 82 which is machined in the outer peripheral surface 70 of the reaction plate 20, and which extends axially from the end face 72 to a shoulder 84 which determines the axial position of the starter crown 78 with respect to the reaction plate 20. The outer surface 70 is thus stepped in diameter, and the crown 78 is fixed to the reaction plate 2 of which it forms a part.

In this fitted state, in which a first lateral surface 86 of the body 80 of the starter crown 78 is in engagement against the shoulder 84, the opposite transverse face 88 of the starter crown 78 lies in substantially the same vertical plane as the axial end face 72 of the reaction plate 20.

The length of each fastening lug 66 is such that, when in position after being introduced into its groove 68, it projects axially, by its free end portion 90, beyond the axial transverse end face 72 of the reaction plate 20 and beyond the lateral surface 88 of the starter crown 78.

The radial thickness "E" of the fastening lug 66 is slightly smaller than the radial distance separating the base 74 of the groove from the cylindrical carrying surface 82, so that it can easily be introduced below the starter crown, that is to say into the interior with respect to the latter.

In the embodiment shown in FIGS. 1 and 2, the fastening of each lug 66 with respect to the reaction plate 20 is obtained by means of a weld seam 92, which is formed between the free end portion 90 and the metallic starter crown 78.

More precisely, the point of welding between the free end portion 90 and the portion, in facing relationship with it, of the lateral surface 88 of the starter crown 78 enables the fastening lug 66 to be immobilised axially with respect to the reaction plate 20, and enables the starter crown 78 to be immobilised against rotation with respect to the reaction plate 20.

In another version not shown in the drawings, the axial immobilisation of each fastening lug 66 with respect to the reaction plate 20 could be obtained by upsetting the free end portion 90 radially inwardly or outwardly in facing relationship with the lateral surface 88 of the starter crown 78.

Figure 8:
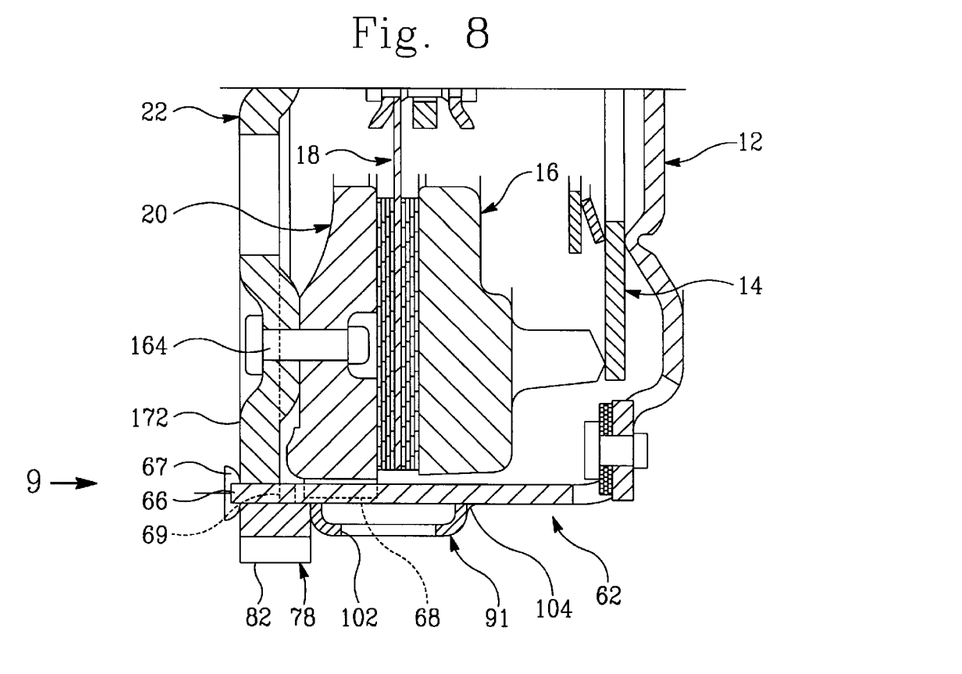
FIG. 8 is a view similar to FIG. 5, and relates to a modified version.
Figure 9:
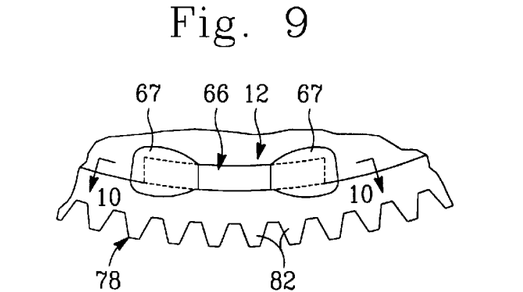
FIG. 9 is a partial view in the direction of the arrow 9 in FIG. 8.
Figure 10:
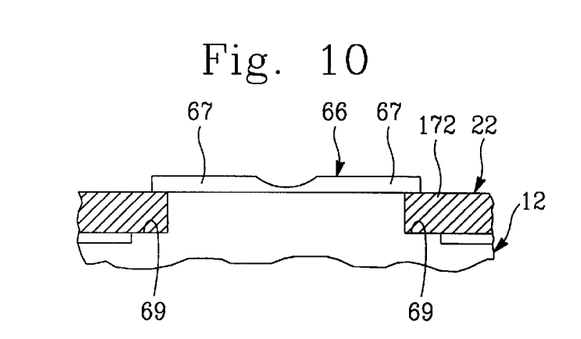
FIG. 10 is a partial view in the direction of the arrow 10—10 in FIG. 9.

Immobilisation may also be obtained by seaming the free end portion 90, in the manner of a rivet head, or by any other equivalent means, for example of the type illustrated in FIGS. 8 to 10. In these two last mentioned versions, the starter crown is shrink-fitted on to its surface 82.

The design of the fastening means 62 is of particular advantage in that it enables the cover plate to be fastened on to the reaction plate in a simple and effective way, by offering up the latter axially so that the lugs 66 can be introduced into the axial passages 68, so that the relative axial position of the cover plate 12 with respect to the reaction plate 20 can then be adjusted, with final fastening being obtained for example by welding.

In FIG. 1 and also in FIG. 4, the lugs 66 can of course project from an annular, axially orientated, skirt 166 at the outer periphery of the outer peripheral flange 58 of the base portion 56 of the cover plate 12.

More precisely, the lugs 66 are formed in the free end of the skirt 166, the form of which is therefore that of an annular comb.

The number of the lugs 66 and grooves 68 depends on the application.

The length of the lugs 66 is of course a function of the length of the grooves 68.

It will be appreciated that this last mentioned embodiment, having lugs 66 projecting from the skirt 166, is preferable because the cover plate is made more rigid. In addition, it is necessary when axial immobilisation is obtained by upsetting of the lugs 66 or by seaming. In that case, a shoulder is formed at the root of the lugs 66, that is to say at their junction with the continuous portion of the skirt 166.

The cover plate is thus immobilised axially between the said shoulder, in contact with the surface 32 of the plate 20, and the upset or seamed end of the lugs 66 in contact with the face 72 or the surface 88.

In the embodiment of FIGS. 1 to 3, the said shoulder is not necessarily in contact with the face 72, because the lugs 66 are secured by welding to the metallic crown 78, that is to say they are immobilised axially in both directions. Because of this arrangement, it is therefore possible for the inclination and/or the position of the diaphragm 14 to be adjusted at the outset.

It will be appreciated that the lugs 66 are in engagement with the pressure plate 20 over a substantial length.

It is of course possible to adjust the position of the primary abutment 52 in a precise manner with respect to the reaction plate. The lugs 66 may be shouldered so as to engage with the surface 32 of the reaction plate.

It will be appreciated that the pressure plate 16 does not have any projecting lugs for fastening the tongues. The plate 16 is accommodated within the cover plate 12, as is the friction disc 18.

It will be noted that the radial face 72 of the reaction plate, opposite to its radial friction surface 32, constitutes the axial end face 72 of the reaction plate.

In another version, this axial end face, furthest away from the friction disc 18, may consist of the axial end face 172 of the support plate 22, and the lugs may be retained axially with respect to the support plate 22 by being fixed on the latter or on the starter crown 78 which is part of the latter.

Thus, in FIGS. 4 to 11, the axially orientated passages 168 are formed at the outer periphery of the support plate 22, so as to extend beyond the axial end face 172 of the support plate 22, while the projecting free end portion 90 of the fastening lug 66 is retained axially with respect to the support plate 22.

In FIGS. 4 to 11, the starter crown 78 is fixed by a weld seam 92 to the support plate 22, being mounted on the peripheral surface 170 of the said support plate 22.

More precisely, the module 100 in FIG. 4 differs from that in FIG. 1 by the fact that the passages 168 are formed in the support plate 22, and in particular by the fact that the pressure plate 16, the Belleville ring 50 of the diaphragm 14, and the cover plate 12, are not provided with passages for the members by which the reaction plate 20 is fastened to the support plate 22, these members consisting of rivets 164 in this embodiment.

These rivets are fitted radially inwardly of the fastening means 62.

As can be seen in FIG. 11, the rivets 164 may of course be replaced by screws 64, the threaded shanks of which extend through the crown portion 30 of the plate 22 so as to be screwed into a threaded hole formed in the reaction plate 20.

In another version, the screws 64 may extend through the plate 20 so as to be screwed into a nut, which is preferably fixed to the crown portion 30, for example by welding.

In FIG. 4, the holes are formed in the torsion damper 44, and through the fingers 55 of the diaphragm 14, these holes being aligned with each other so as to give access to the heads of the studs 26.

The torsion damper is of the same type as that which is described in the document FR-A-2 710 377, or in French patent application FR-A-2 723 996.

Thus, the rings and the damper plate of the main damper and predamper of the said damper 44 are provided, radially inwardly of the resilient members which elastically couple the damper plate to the guide rings, with holes and/or slots which are in alignment on a common axis Y—Y, thus providing a passage for a tool for fitting the clutch module on to the crankshaft 110 by tightening the studs 26, so securing the support plate 22 to the crankshaft 110.

The fastening means 62 consist of a set of generally axially orientated fastening lugs 66 which, as in FIG. 1, extend axially from the peripheral edge 58 of the portion 56, in the form of an annular disc, of the cover plate 12, towards the support plate 22.

The lugs 66, which constitute tenons, are for example spaced apart circumferentially in a uniform way at the periphery of the cover plate 12.

Each fastening lug 66 is received, in this example with a fitting clearance, in an axially orientated passage 168 formed in the vicinity of the outer surface of the peripheral annular crown portion 30 of the support plate 22. The passages 168 are easy to make, for example by press-forming.

In the embodiment shown in FIGS. 4 to 7, each passage 168, which defines a mortice, is made in the form of an axial groove which is open at both ends.

Each groove 168 is bounded radially inwardly by a base 174, and it is open radially outwardly in the outer peripheral surface 170 of the support plate 22.

Figure 5:
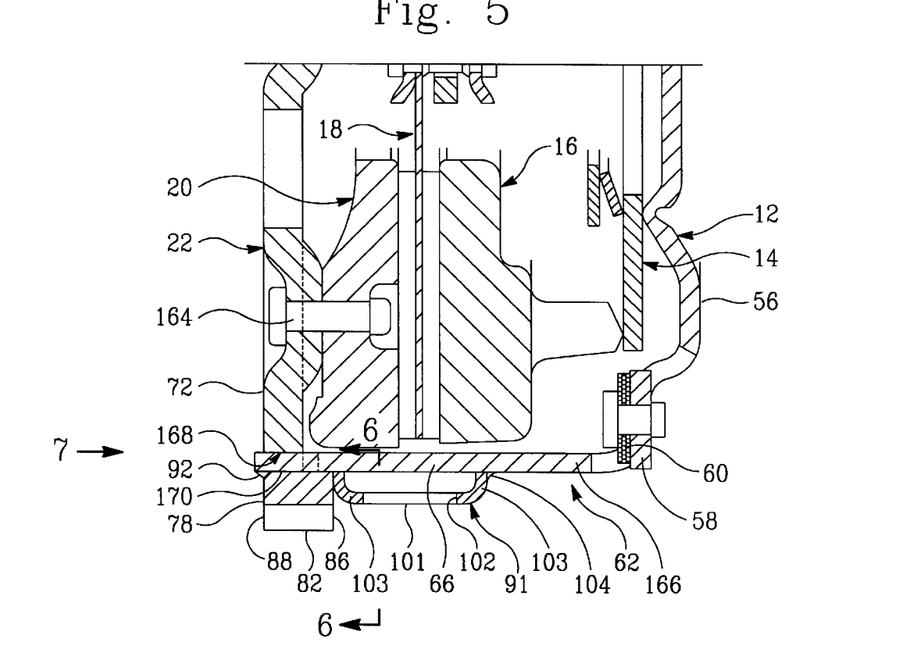
FIG. 5 is a view on an enlarged scale of the lower part of FIG. 4.
Figure 6:
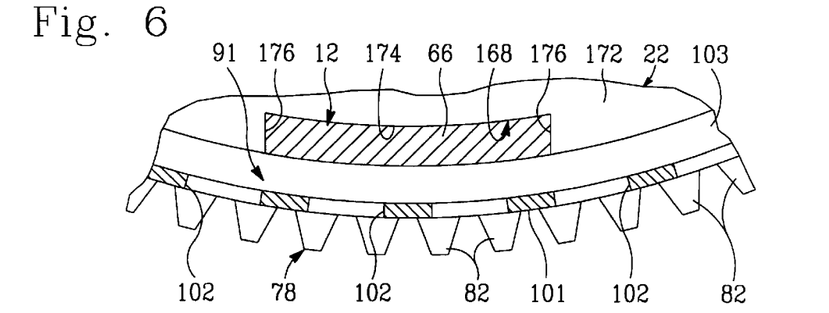
FIG. 6 is a partial view in cross section taken on the line 6—6 in FIG. 5.
Figure 7:
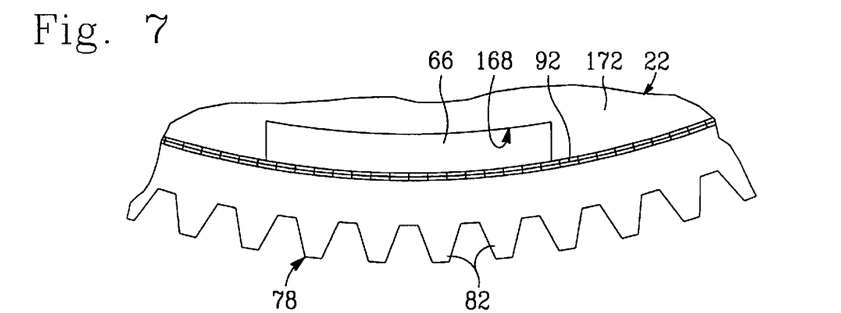
FIG. 7 is a partial view in the direction of the arrow 7 in FIG. 5.

The width of each groove, defined between its two parallel flanks 176, is slightly greater than the circumferential width of the fastening lug 66, so that the latter is able to be easily introduced with a fitting clearance axially into the groove 168, from right to left in FIG. 5. An assembly of the tenon and mortice type is thus formed.

In this embodiment, the clutch module 100 carries at its periphery a starter crown 78, which in this example is of metal, and which is of generally annular form consisting of an annular cylindrical body with teeth 82.

The starter crown 78, in accordance with one feature, is mounted on the outer peripheral surface 170 of the support plate 22.

In this fitted state, in which a first transverse surface 86 of the body of the starter crown 78 is in engagement against an ignition timing ring 91 to be described later herein, the opposite transverse face 88 of the starter crown 78 lies in substantially the same vertical plane as the axial end face 172 of the support plate 22.

The length of each fastening lug 66 is such that, when in position after being introduced into its groove 168, it projects axially, by its free end portion, beyond the transverse axial end face 172 of the support plate 22, and beyond the lateral surface 88 of the starter crown 78.

The radial thickness of the fastening lug 66 is slightly smaller than the radial distance that separates the base 174 of the passage 168 from the outer peripheral surface 170, so that it can be easily introduced, with a fitting clearance, below the starter crown 78, that is to say inwardly with respect to the latter.

In the embodiment shown in FIGS. 4 to 7, the fastening of each lug 66 with respect to the support plate 22 is obtained by means of a continuous weld seam 92 which is formed between its free end portion 90 and the metallic starter crown 78, and this weld seam also joins the starter crown 78 to the support plate 22. This embodiment is particularly simple, and leads to robust fastening. In addition, fastening can be carried out in a single operation.

More precisely, the point of welding between the free end portion and the portion, in facing relationship with it, of the lateral surface 88 of the starter crown 78 enables the fastening lug 66 to be immobilised axially with respect to the support plate 22, and enables the starter crown 78 to be immobilised against rotation with respect to the support plate 22.

The clutch module carries a timing ring which consists of an attached component; more precisely, in this example the timing ring 91 is a component made from metal plate and attached, being secured by welding. The timing ring 91 comprises a cylindrical middle portion 101 which is formed with apertures 102, which are spaced apart circumferentially and joined by spacing elements 103 to the cover plate 12, via the lugs 66 of the latter, which it surrounds; the spacing elements 103 in this example are in the form of solid transverse portions; in another version, the spacing elements are transverse lugs which are spaced apart circumferentially; as can be seen in FIGS. 1 and 2. The timing ring 91 is placed axially against the starter crown 78, so that, in order to fix it to the cover plate 12, a weld seam 104 is formed only between the lugs 66 and the element 103 opposite to the one which is in contact with the starter crown 78.

In another version not shown in the drawings, the axial immobilisation of each fastening lug 66 with respect to the plate 22, and therefore with respect to the reaction plate 20, could be obtained by upsetting the free end portion radially inwardly into contact with the face 172 of the plate 22, or outwardly into facing relationship with the lateral surface 88 of the starter crown 78.

This immobilisation can also be obtained by upsetting the free end portion in the same way as a rivet head, or in any other equivalent way: it is the embodiment shown in FIGS. 8 to 10 that shows retaining heads 67, on either side of the lugs 66 and in contact with the face 172 of the plate 22; axial immobilisation is obtained by virtue of a shoulder 69 formed on each side of the lugs 66, on which the support plate 22 is engaged.

In these two last mentioned versions, the starter crown is welded to the support plate 22 outside the lugs 66.

The design of the fastening means 62 is of particular advantage in that it enables the cover plate 12 to be fastened on to the support plate 22 in a simple and effective way, by offering up the latter axially so that the lugs 66 can be introduced into the axial passages 168, so that the relative axial position of the cover plate 12 with respect to the support plate 22, and therefore with respect to the reaction plate 20 can then be adjusted, with final fastening of the starter crown 78 being obtained for example by welding.

The lugs 66 can of course project from an annular, axially orientated, skirt 166 (FIG. 5) at the outer periphery of the outer peripheral flange 58 of the base portion 56 of the cover plate 12.

More precisely, the lugs 66 are formed in the free end of the skirt 166, the form of which is therefore that of an annular comb.

The number of the lugs 66 and grooves 168 depends on the application.

The length of the lugs 66 is of course a function of the length of the grooves 168.

It will be appreciated that this last mentioned embodiment, having lugs 66 projecting from the skirt 166, is preferable because the cover plate is made more rigid. In addition, it is necessary when axial immobilisation is obtained by upsetting of the lugs 66 or by seaming. In that case, a shoulder is formed at the root of the lugs 66, that is to say at their junction with the continuous portion of the skirt 166. The cover plate is thus immobilised axially between the said shoulder, in contact with the inner face of the support plate 22, and the upset or seamed end of the lugs 66 in contact with the face 172 or the surface 88.

In the embodiment of FIGS. 4 to 7, the said shoulder is not necessarily in contact with the face 172, because the lugs 66 are secured by welding to the metallic starter crown 78, that is to say they are immobilised axially in both directions. Because of this arrangement, it is therefore possible for the inclination and/or the position of the diaphragm 14 to be adjusted at the outset.

It is of course possible to adjust the position of the primary abutment 52 in a precise manner with respect to the support plate 22. The lugs 66 may be shouldered so as to engage with the internal face 32 of the support plate 22.

It will be appreciated that the pressure plate 16 does not have any projecting lugs for fastening the tongues. The plate 16 is accommodated within the cover plate 12, as is the friction disc 18.

As will be evident from the description and the drawings, the number of apertures 102 in the ignition timing ring 91 depends on the application, and in particular on whether the engine is a petrol or a diesel engine. The timing ring 91 thus enables the cover plate 12 to be standardised, and its contact with the starter crown 78 enables its fitting to be simplified while giving good resistance to centrifugal force, the said timing ring being unable to become detached.

In general terms, the fastening of the lugs 66 to the plate 22 is reliable and of reduced size, and enables good rotational coupling of the cover plate 12 with the plate 22 to be obtained, leading to good weld integrity.

The friction disc may come very close to the lugs 66, because the fastening means in accordance with the invention are offset axially with respect to the said disc.

The present invention is of course not limited to the embodiment described. In particular, in the embodiment of FIGS. 4 to 11, it may be envisaged that the lugs 66 could pass through the passages 168 with a circumferential clearance.

It is then possible to modify the reaction plate 20 so that it has the passages 68, as can be seen in broken lines in FIG. 8, of the embodiment shown in FIGS. 3 to 6. This is possible because the lugs 66 are long enough. In this case, the cover plate 12 is positively connected to the reaction plate 20 through its lugs 66, which constitute tenons engaged in the passages 68, the latter constituting mortices of the reaction plate 20.

The passages 68, 168 are of course aligned axially with each other so that the lugs 66 can pass through them.

The free end portions of at least some of the fastening lugs 66, which project axially with respect to the support plate 22, are retained axially with respect to the support plate 22, either directly or indirectly with respect to the starter crown of the support plate 22, by being welded to the latter. In this way the lugs are fixed to the support plate 22.

In this case, the starter crown is not shrunk on to the reaction plate, and is part of the support plate as in FIGS. 4 to 11.

The ignition timing ring 91 is of course not an indispensable component.

In another version, the lugs 66 may be positively coupled in rotation to the support plate 22, via the passages 168 of the latter, so as to pass through the passages 66 in the reaction plate with a circumferential clearance.

In a further version, the starter crown 78 may be welded to the reaction plate 20, and the lugs can extend, with a fitting clearance, through the passages 68 as in FIGS. 1 to 3, and with a circumferential clearance through the passages 168, while the free end portions of the said lugs may for example be welded to the plate 22.

The lugs 66 may of course pass through the aligned passages 68, 168 with a fitting clearance.

In general terms, the lugs 66 are not necessarily all fixed to one of the elements consisting of the reaction plate and the support plate, given that the starter crown is part of one of the said elements. Some of the lugs may be coupled in positive rotation to only one of the said elements, and may consist only of lugs for preventing rotation, engaged in the passages.

For example, a widened lug for preventing rotation may be provided, its associated passage constituting a locating element.

The lugs 66 may be fitted without any clearance in the passages 68, 168. However, it will be noted that this is less convenient in terms of adjusting the load exerted by the diaphragm.

It is preferable that the lugs 66 should pass through the passages 68, 168 with a fitting clearance as described above.

We claim:

1. A clutch module (100) for a motor vehicle, comprising: an assembly of adjacent components of generally annular form coaxial with each other, among which are arranged, in succession, a cover plate (12), a diaphragm (14), a pressure plate (16) coupled in rotation to the cover plate by attachment means (60) for enabling the pressure plate (16) to be displaced axially with respect to the cover plate (12), a friction disc (18) for coupling the clutch module (100) in rotation to a driven shaft, and a reaction plate (20) fixed to the cover plate (12) by fastening means (62) arranged at the outer periphery of the module (100), and of the type in which the reaction plate is mounted, on a support plate (22) fixed to a driving shaft for rotation with the latter, by means of a set of fastening members (64) which are located radially inwardly with respect to the fastening means (62), the module comprising at its outer periphery a starter crown (78) carried by one of the elements consisting of the support plate (22) and the reaction plate (20), wherein the pressure plate (16) is coupled directly in rotation to the cover plate (12) by the attachment means and the cover plate (12) includes at its outer periphery a set of fastening lugs (66) which extend axially from a peripheral edge (58) of the cover plate (12, 56), and each of which extends axially through a corresponding axially orientated passage (68, 168) formed at the outer periphery (70, 170) of one of the elements consisting of the support plate (22) and the reaction plate (20), so as to extend axially (90) beyond the axial end face (72, 172) of the element that lies furthest away from the friction disc (18), and the projecting free end portion (90) of the fastening lug (66) is retained axially with respect to one of the elements of the support plate (22) and the reaction plate (20).

2. A clutch module according to claim 1, wherein the fastening lugs (66) project from an axially orientated annular skirt (166) which forms part of the cover plate (12) at its outer periphery.

3. A clutch module according to claim 1, wherein the fastening lugs (66) extend through the passages (68, 168) with a clearance.

4. A clutch module according to claim 1, wherein each passage (68, 168) is located radially inwardly with respect to the starter crown (78).

5. A clutch module according to claim 1, wherein the free end portion (90) is seamed.

6. A clutch module according to claim 1, wherein the free end portion is welded to the starter crown (78).

7. A clutch module according to claim 1, wherein the fastening lugs (66) extend through a corresponding axially orientated passage (68) formed at the outer periphery of the reaction plate (20) so as to extend beyond the axial end face (72) of the reaction plate (20) furthest away from the friction disc (18).

8. A clutch module according to claim 7, wherein the projecting free end portion (90) of at least some of the fastening lugs (66) is retained axially with respect to the reaction plate (20).

9. A clutch module according to claim 8, wherein each passage (68) made in the form of an annular groove (68) formed in the outer peripheral surface (70) of the reaction plate (20), and is open radially outwardly.

10. A clutch module according to claim 9, wherein the reaction plate (20) carries a starter crown (78) at its outer periphery (70), and in that each passage (68) is located radially inwardly with respect to the starter crown (78).

11. A clutch module according to claim 10, wherein the starter crown (78) is fitted on a surface (82) which is machined in the outer peripheral surface (70) of the reaction plate (20), and the radial depth of which is smaller than that of the axial groove (68, 74).

12. A clutch module according to claim 7, wherein the fastening lugs (66) extend axially, with a circumferential clearance, through a passage formed at the outer periphery (170) of the support plate (22), and the projecting free end portion of the fastening lug (66) is retained axially with respect to the support plate (22).

13. A clutch module (10) according to claim 1, wherein each of the fastening lugs for the cover plate extends axially through an axially orientated passage (168) formed at the outer periphery (170) of the support plate (22), so as to extend axially beyond the axial end face (72) of the support plate (22), and in that the projecting free end portion of the fastening lug (66) is retained axially with respect to the support plate (22).

14. A clutch module according to claim 13, wherein the starter crown (78) is secured by welding (92) to the support plate (22), being fitted on the outer peripheral surface (70) of the support plate (22).

15. A clutch module (100) for a motor vehicle, comprising: an assembly of adjacent components of generally annular form coaxial with each other, among which are arranged, in succession, a cover plate (12), a diaphragm (14), a pressure plate (16) coupled in rotation to the cover plate by attachment means (60) for enabling the pressure plate (16) to be displaced axially with respect to the cover plate (12), a friction disc (18) for coupling the clutch module (100) in rotation to a driven shaft, and a reaction plate (20) fixed to the cover plate (12) by fastening means (62) arranged at the outer periphery of the module (100), and of the type in which the reaction plate is mounted, on a support plate (22) fixed to a driving shaft for rotation with the latter, by means of a set of fastening members (64) which are located radially inwardly with respect to the fastening means (62), the module comprising at its outer periphery a starter crown (78) carried by one of the elements consisting of the support plate (22) and the reaction plate (20), wherein the pressure plate (16) is coupled directly in rotation to the cover plate (12) by the attachment means and the cover plate (12) includes at its outer periphery a set of fastening lugs (66) which extend axially from a peripheral edge (58) of the cover plate (12, 56), and each of which extends axially through a corresponding axially orientated passage (68, 168) formed at the outer periphery (70, 170) of one of the elements consisting of the support plate (22) and the reaction plate (20), so as to extend axially (90) beyond the axial end face (72, 172) of the element that lies furthest away from the friction disc (18), and the projecting free end portion (90) of the fastening lug (66) is retained axially with respect to one of the elements of the support plate (22) and the reaction plate (20), wherein, each of the fastening lugs for the cover plate extends axially through an axially orientated passage (168) formed at the outer periphery (170) of the support plate (22), so as to extend axially beyond the axial end face (72) of the support plate (22), the projecting free end portion of the fastening lug (66) is retained axially with respect to the support plate (22), the starter crown (78) is secured by welding (92) to the support plate (22), being fitted on the outer peripheral surface (70) of the said support plate (22), and the free end portion is welded (92) to the starter crown (78).

16. A clutch module (100) for a motor vehicle, comprising: an assembly of adjacent components of generally annular form coaxial with each other, among which are arranged, in succession, a cover plate (12), a diaphragm (14), a pressure plate (16) coupled in rotation to the cover plate by attachment means (60) for enabling the pressure plate (16) to be displaced axially with respect to the cover plate (12), a friction disc (18) for coupling the clutch module (100) in rotation to a driven shaft, and a reaction plate (20) fixed to the cover plate (12) by fastening means (62) arranged at the outer periphery of the module (100), and of the type in which the reaction plate is mounted, on a support plate (22) fixed to a driving shaft for rotation with the latter, by means of a set of fastening members (64) which are located radially inwardly with respect to the fastening means (62), the module comprising at its outer periphery a starter crown (78) carried by one of the elements consisting of the support plate (22) and the reaction plate (20), wherein the pressure plate (16) is coupled directly in rotation to the cover plate (12) by the attachment means and the cover plate (12) includes at its outer periphery a set of fastening lugs (66) which extend axially from a peripheral edge (58) of the cover plate (12, 56), and each of which extends axially through a corresponding axially orientated passage (68, 168) formed at the outer periphery (70, 170) of one of the elements consisting of the support plate (22) and the reaction plate (20), so as to extend axially (90) beyond the axial end face (72, 172) of the element that lies furthest away from the friction disc (18), and the projecting free end portion (90) of the fastening lug (66) is retained axially with respect to one of the elements of the support plate (22) and the reaction plate (20), wherein, each of the fastening lugs for the cover plate extends axially through an axially orientated passage (168) formed at the outer periphery (170) of the support plate (22), so as to extend axially beyond the axial end face (72) of the support plate (22), the projecting free end portion of the fastening lug (66) is retained axially with respect to the support plate (22), and each passage (68) is an axial groove formed in the outer peripheral surface (170) of the support plate (22), and is open radially outwardly.

17. A clutch module according to claim 16, wherein each passage (68) is located radially inwardly with respect to the starter crown (78).

* * * * *